(12) United States Patent
Miller (10) Patent No.: US 8,081,091 B2
(45) Date of Patent: Dec. 20, 2011

(54) SECURE KEYPAD SCANNING

(75) Inventor: Jeremy J. Miller, Meridian, ID (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 811 days.

(21) Appl. No.: 12/221,279

(22) Filed: Jul. 31, 2008

(65) Prior Publication Data

US 2010/0026529 A1 Feb. 4, 2010

(51) Int. Cl.
*H03K 17/94* (2006.01)
(52) U.S. Cl. .......................................................... 341/22
(58) Field of Classification Search ...................... 341/22
See application file for complete search history.

(56) References Cited

U.S. PATENT DOCUMENTS

4,926,173 A 5/1990 Frielink ........................... 341/22

*Primary Examiner* — Robert L. Deberadinis
(74) *Attorney, Agent, or Firm* — North Weber & Baugh (57) ABSTRACT

A secure key scanning functionality drives the row lines and column lines of a key switch array with randomized pulses of different polarities, and drives signals in one direction from a row line through a pressed key and to a column line as well as in an opposite direction from the column line through the pressed key and to the row line. To make unauthorized detecting of key presses more difficult, row lines and column lines are driven with pulses that appear as actual key press conditions when in fact the pulses are dummy pulses and no corresponding key has been pressed. In one novel aspect, dummy pulses are generated so that the line being driven with the dummy pulses has the same sustained and consistent waveform as the intersecting row and column lines that have identical waveforms due to the actual key press.

24 Claims, 6 Drawing Sheets (PRIOR ART)

FIG. 1

(PRIOR ART)

○ = DENOTES POSSIBLE KEY PRESS POSITION

DETECT KEY PRESS BY ALWAYS DRIVING TWO LINES (E.G., R0,R2) AT THE SAME TIME, DETECT A RESPONSE (E.G., ON C1)

FIG. 7A

DRIVE THE LINE THAT GAVE THE RESPONSE AND ONE OF THE LINES PREVIOUSLY DRIVEN

DRIVE THE LINE THAT GAVE THE RESPONSE AND ONE OF THE LINES PREVIOUSLY DRIVEN

NO RESPONSE DETECTED ON R2, THEREFORE (R0,C1) WAS PRESSED

RESPONSE ON R2, THEREFORE (R2,C1) WAS PRESSED

KEY PRESS DETECTED, BUT THIEF CAN DIFFERENTIATE R2 WAVEFORM FROM R0 AND C1 WAVEFORMS

KEY PRESS DETECTED BUT THIEF CANNOT DIFFERENTIATE THE R0, R2 AND C1 WAVEFORMS

SECURE KEYPAD SCANNING

TECHNICAL FIELD

The described embodiments relate to secure key scanning devices and techniques.

BACKGROUND INFORMATION

Financial transactions are often made using secure electronic devices such as Automatic Teller Machines (ATMs) and Point Of Sale (POS) terminals. In one type of transaction, the user provides a magnetic card to the secure device and a magnetic card reader of the secure device reads information from the card. The user then uses a keypad on the secure device to enter a Personal Identification Number (PIN) or other security information. If the PIN number or other security information entered is correct for the information read from the magnetic card, then the user is allowed to engage in a financial transaction.

In one type of security attack, a thief does not interfere with the financial transaction the user is making, but rather monitors the transaction and learns the user's PIN number and its associated magnetic card information. The thief can then use this information later to steal money from the user.

In one kind of attack, a thief places a small inconspicuous auxiliary card reading device in line with the real magnetic card reader of the security device. As the user swipes a magnetic card through the magnetic card reader of the security device, the card also passes through the auxiliary reader. The thief also foils anti-tamper circuitry of the security device and gains access to the backside of the keypad within the security device. There the thieves couple wires to the row and column wires of the row line/column line matrix. These wires are made to extend to an auxiliary monitoring device that the thief places inside the security device. As keys on the keypad are pressed, the auxiliary device senses the changing signals on the row and column lines of the row line/column line matrix and decodes these signals to determine which keys the user pressed. In this way the auxiliary monitoring device determines the user's PIN number. Also wires from the auxiliary card reading device are coupled to this auxiliary device so that the auxiliary monitoring device also stores information read from the user's magnetic card. The secure device with the auxiliary monitoring device is placed back in the field for unsuspecting users to use. As the unsuspecting users use the secure device, the auxiliary device within the secure device learns and records their PIN numbers and magnetic card information. At some later time the thief returns or otherwise reads the stolen PIN and magnetic card information from the auxiliary monitoring device. The thief then uses the PIN and magnetic card information to steal money from the users.

Figure 1:
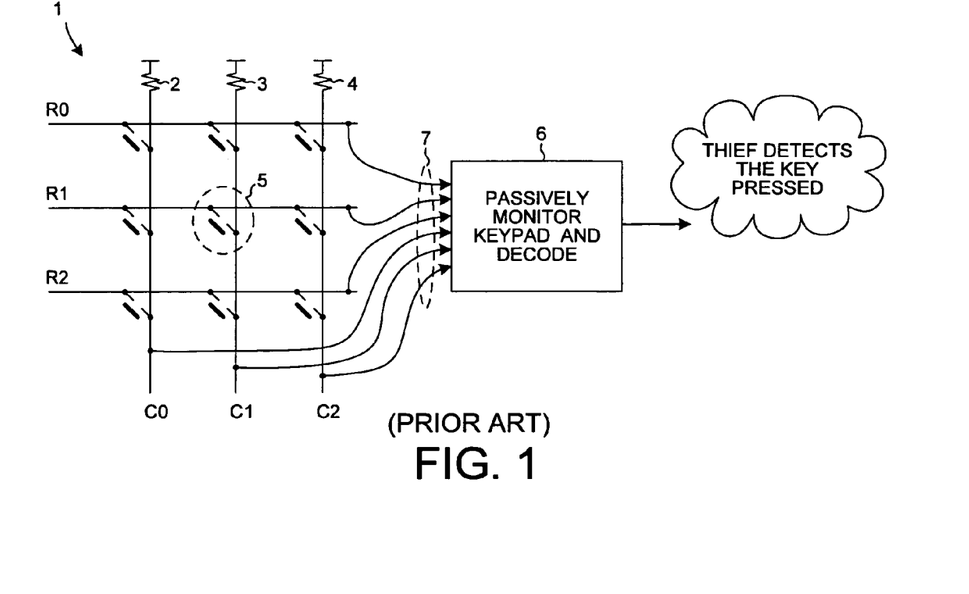
FIG. 1 (Prior Art) is a diagram that illustrates how row and column lines can be passively monitored in an unauthorized manner to determine which keys of a keypad have been pressed.

FIG. 1 (Prior Art) is a simplified diagram of a keypad of a secure device. In this example, the keypad 1 has three horizontally extending row lines designated R0-R2, three vertically extending column lines designated C0-C2, and three pullup resistors 2-4. At each intersection where a row line crosses a column line a key switch is provided. Key switch 5, for example, is located at the intersection of row line R1 and column line C1. If the key switch is pressed, then the switch makes an electrical connection between row line R1 and column line C1. The other key switches work in a similar fashion.

Figure 2:
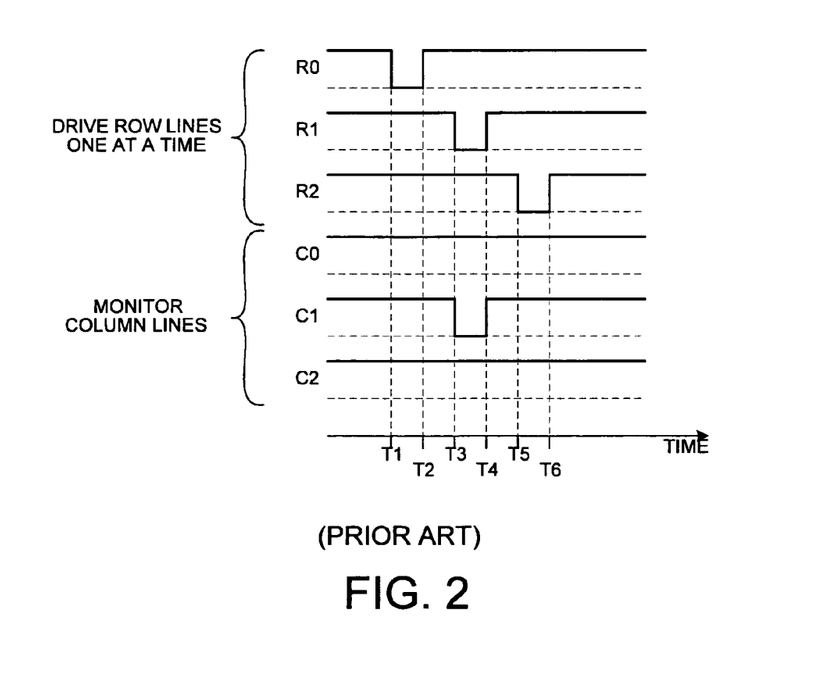
FIG. 2 is a waveform diagram that illustrates a conventional key scanning operation.

FIG. 2 (Prior Art) illustrates how the secure device scans the keypad to determine when a key is pressed and which key is pressed. A key scanning circuit drives low pulses out on the row lines, one by one, in sequence. When a row line is driven with a low pulse, the key scanning circuit monitors the column lines. If a column line exhibits a low pulse, then it is determined that the switch at the intersection of the currently driven row line and the column line is being pressed. FIG. 2 illustrates an example in which a low pulse is driven out on row line R0 at time T1, in which a low pulse is driven out on row line R1 at time T3, and in which a low pulse is driven out on row line R2 at time T5. When row line R1 is driven low, the column line C1 is detected to be low. It is therefore determined that the switch 5 at the intersection of row line R1 and column line C1 is pressed.

In the example of the thief described above, the thief places auxiliary monitoring device 6 in the secure device (for example, in the ATM) and hooks the auxiliary monitoring device via tap wires 7 to the row and column lines as illustrated. The auxiliary monitoring device then monitors the voltages on the row and column lines and determines which keys are pressed in the same way, and along with, the legitimate key scanning circuitry of the secure device. Methods and structures are sought to prevent this type of attack or to make carrying out this type of attack more difficult and/or expensive.

U.S. Pat. No. 4,926,173 discloses a keyboard apparatus that scans column lines and monitors row lines. The apparatus sometimes drives one or more row lines during a key scan read operation, thereby simulating one or more key presses. These simulated key presses make it more difficult for a thief who might be monitoring the row lines and column lines as in FIG. 1 to differentiate genuine key presses from simulated key presses. In addition, the apparatus randomizes the column line scan order so that when a column is being scanned is not so apparent. Moreover, the apparatus randomizes the driving of row lines with simulated key presses during row line reading thereby further complicating an unauthorized key press decoding. The key scanning circuit of U.S. Pat. No. 4,926,173, however, has shortcomings. An alternative and/or improved key scanning circuit and technique is desired.

SUMMARY

An integrated circuit within a secure device has a novel secure key scanning functionality. The key scanning functionality drives the row lines and column lines of a key switch array with randomized pulses of different polarities, and drives signals in one direction from a row line through a pressed key and to a column line as well as in an opposite direction from the column line through the pressed key and to the row line. To make unauthorized detecting of key presses more difficult, row lines and column lines are driven with pulses that appear as real key press conditions when in fact the pulses are dummy pulses.

In one example, the integrated circuit employs a novel input/output cell. The cell is used both to drive pulses onto lines of the key switch array as well as to detect pulses received from lines of the key switch array. The input/output cell includes a logic circuit that facilitates the parallel reading of all the input/output cells that coupled to the key switch array. Cells that are configured as input cells and are masked are read to have the value that is opposite to a mask polarity bit. Similarly, cells that are configured as output cells read to have the value that is opposite to a mask polarity bit. If, for example, low pulses are being supplied to the key switch array in a key scanning operation, the input/output cells that are configured as output cells are read as digital logic high values. Similarly, input/output cells that are configured as input cells that are masked are read as digital logic high values. Accordingly, during a parallel read of the input/output cells coupled to the key switch array, the only bits that will be read as digital logic low values will be for input/output cells that are configured as input cells and that are not masked.

In one novel aspect, dummy pulses are generated so that the row line or column line being driven with the dummy pulses will have the same sustained and consistent waveform as the waveforms on the intersecting row and column lines that have identical waveforms due to the actual key press. In one example, the first pulse due to an actual key press is detected on a line (for example, a column line) when two other intersecting lines (for example, two row lines) are driven with identical pulses. In response to this detecting, the line (for example, the column line) upon which the first pulse was detected is driven with a second pulse and one of the two intersecting lines (for example, a first of the two row lines) is to detect the second pulse. The other of the two intersecting lines (for example, a second of the two row lines) is driven with a pulse identical to the second pulse. In one possible key press scenario, the key that is pressed is identified by the key scanning functionality while keeping the waveforms on the three lines identical to one another. By keeping the waveforms on the three lines identical, an unauthorized determining which key was pressed is made more difficult. By determining multiple key presses in a sequence of actual key presses in this manner, a thief's determining of the sequence of actual key presses is made even more difficult.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 3:
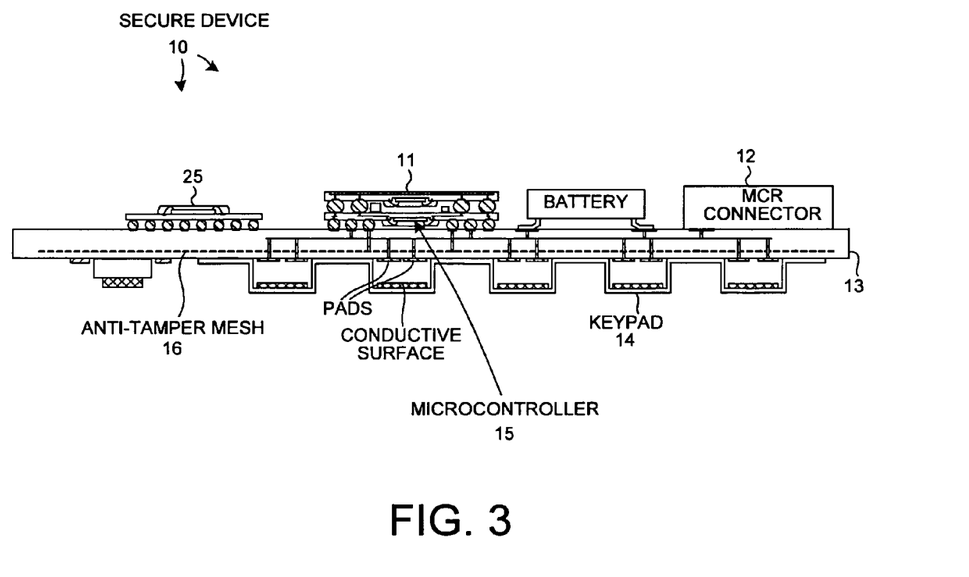
FIG. 3 is a cross-sectional diagram of a PCB assembly portion of a secure device in accordance with one novel aspect.

FIG. 3 is a simplified cross-sectional diagram of a printed circuit board (PCB) assembly portion of a secure device 10 in accordance with one novel aspect. The outer enclosure of the secure device circuitry is not shown in the illustration. Secure device 10 includes a package-on-package device 11 as well as a magnetic card reader connector 12 and other components that are mounted to one side of a PCB 13. A flexible keypad 14 is disposed on the opposite side of the printed circuit board 13 as illustrated. In this example, the PCB side of each key of the flexible keypad 14 includes a conductive surface such that when the key is pressed toward the PCB, its conductive surface makes physical and electrical contact with two adjacent conductive pads on the surface of the PCB. One of these conductive pads is a pad portion of a row line of a row line/column line matrix (RLCLM) within the PCB, whereas the other of the conductive pads is a pad portion of an intersecting column line of the RLCLM. The RLCLM and the keypad 13 are referred to together here as a key switch array.

POP device 11 includes an integrated circuit 15 that in turn includes key scanning functionality. Integrated circuit 15 is coupled via bond balls of the POP device 11 to PCB 13 and to the row and column lines of the RLCLM within the PCB. In one example, the PCB also includes an anti-tamper mesh 16 of conductors that are realized in conductive layers of the PCB. Connections to the conductive pads extend from the remainder of the row lines and column lines through mesh 16 and toward the keys as illustrated. The pads are considered extensions of the row lines and column lines.

Figure 4:
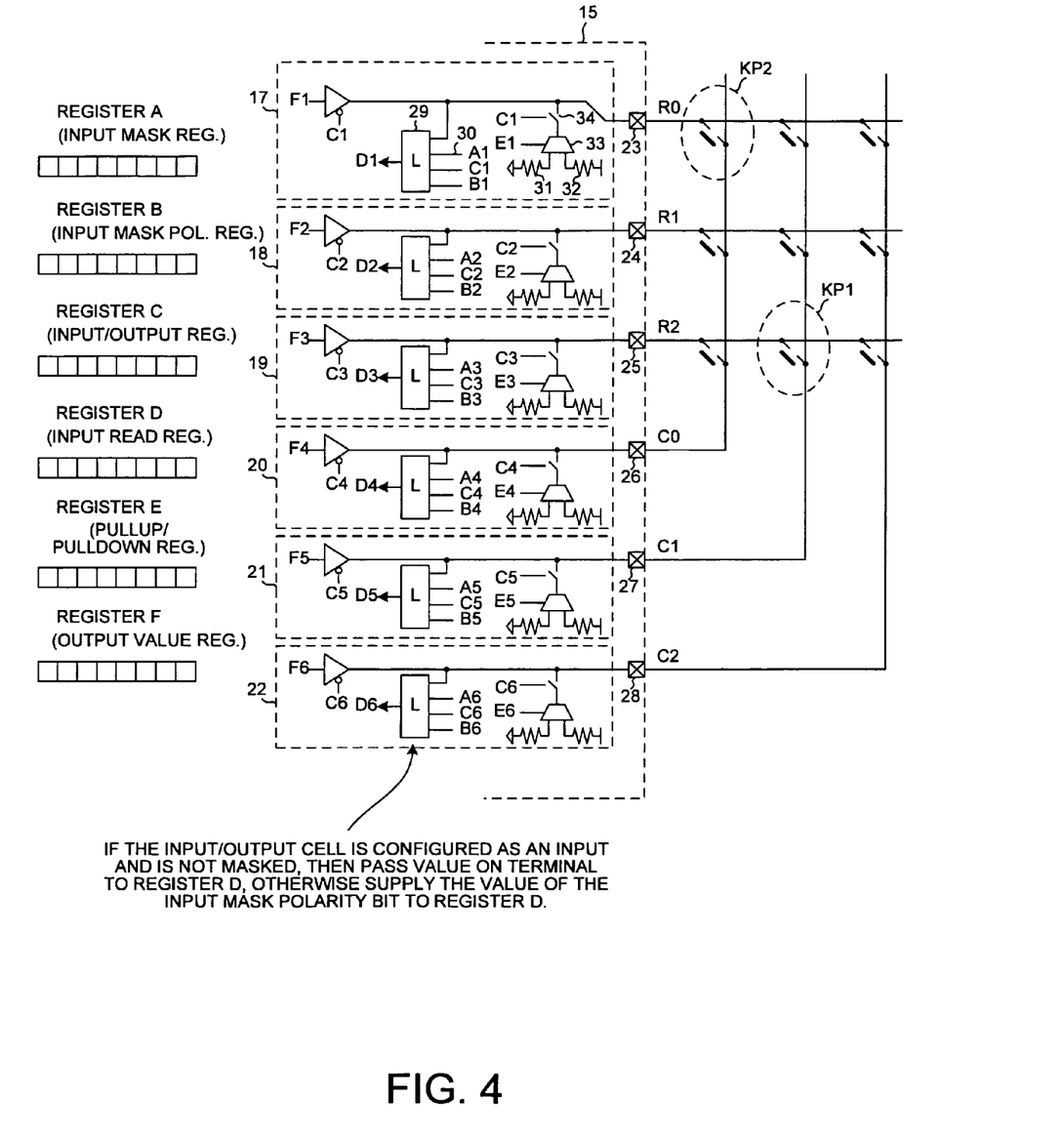
FIG. 4 is a diagram of a key scanning functionality within the integrated circuit 15 of the secure device of FIG. 3.

FIG. 4 is a more detailed diagram of a portion of integrated circuit 15 and the key switch array. In the simplified example illustrated, the RLCLM of the key switch array includes three horizontally extending row lines designated R0, R1 and R2, three vertically extending column lines designated C0, C1 and C2, and nine associated switch keys. In the illustration of FIG. 4, the switch key at the intersection of row line R0 and column line C0 is designated key KP2. The switch key at the intersection of row line R2 and column line C1 is designated key KP1.

Integrated circuit 15 includes six identical input/output cells 17-22 and six associated terminals 23-28. In addition, integrated circuit 15 includes a processor (not illustrated), a processor-readable medium (not illustrated) that stores a key scanning routine of processor-readable instructions, and six registers A through F. Register A is an input mask register. Register B is an input mask polarity register. Register C is an input/output register. Register D is an input read register. Register E is a pullup/pulldown register. Register F is an output value register. There is one bit in each register associated with each of the six input/output cells 17-22. For example, there is a bit A1 in input mask register A and this bit A1 is an input to a logic circuit 29 of input/output cell 17. If bit A1 is a digital logic high then a digital logic high is supplied to input lead 30 of logic circuit 29, whereas if bit A1 is a digital logic low then a digital logic low is supplied to input lead 30. The contents of the other bits of register A and the other registers B-F are coupled to circuitry in the various other input/output cells in a similar fashion as illustrated in FIG. 4.

Each input/output cell can be independently configured under software control by the processor to be either an input cell or an output cell by writing an appropriate digital logic value into a corresponding bit in register C. If, for example, input/output cell 17 is to be configured as an output cell, then a digital logic low is written into bit C1 of register C. If input/output cell 20 is to be configured as an input cell, then a digital logic high is written into bit C4 of register C.

If an input/output cell is configured as an input cell, then it may be configured such that either a pullup resistance is coupled to its associated terminal, or such that a pulldown resistance is coupled to its associated terminal. Whether a pullup resistance or a pulldown resistance is coupled to its associated terminal is determined by the digital logic value of the corresponding bit in register E. In the example of input/output cell 17, the pullup resistance is provided by resistor 31 and the pulldown resistance is provided by resistor 32. One of these two resistances is coupled to terminal 23 via an analog multiplexer 33 and a switch 34 when the input/output cell is configured as an input cell. It is recognized that there are many ways to realize this functionality. The specific circuit illustrated in FIG. 4 is but one suitable way.

In one novel aspect, all the bit values of input register D can be read in parallel at once, even if some of the associated input/output cells are configured and operating as output cells. The logic circuit of each input/output cell operates such that if the input/output cell is operating as an output cell, then the logic circuit supplies the opposite of the value of the corresponding polarity bit in the input mask polarity register (register B) to register D. Accordingly, if the polarity bit for the cell is set to indicate that low pulses are to be output from the cell, then the input mask polarity bit is a digital logic low. The logic circuit of the cell therefore supplies a digital logic high to the corresponding bit in the input read register D.

If, however, the input/output cell is configured as an input cell and the corresponding bit in the input mask register is not set, then the logic circuit passes the value on the associated terminal to input read register D. If the input/output cell is configured as an input cell and the corresponding bit in the input mask register is set, then the logic circuit supplies the opposite of the input mask polarity bit to input read register D.

Due to this architecture, some input/output cells can drive row and column lines with pulse signals at the same time that the other of the input/output cells are used to monitor and detect the digital values on the other row and column lines. The processor can, in a single parallel read of register D, read the values from all the input/output cells that are operating as non-masked input cells. The bits corresponding to all other input/output cells (input/output cells that are configured as output cells and input/output cells that are configured as input cells but are masked) will be read from register D to have the opposite value of the input mask polarity bit value. If, for example, low pulses are be output to the row and column lines in a key pulse operation, then all input/output cells that are configured as output cells and all input/output cells that are configured as masked input cells will be read as digital logic high values. The only bits in input read register D that will be read as low digital logic values will correspond to non-masked input/output cells that have detected digital logic low pulses. Due to the architecture of the logic circuit within each input/output cell, the key scanning routine that detects which row and column lines have been driven low due to the pressing of key or keys is simplified.

Figure 5:
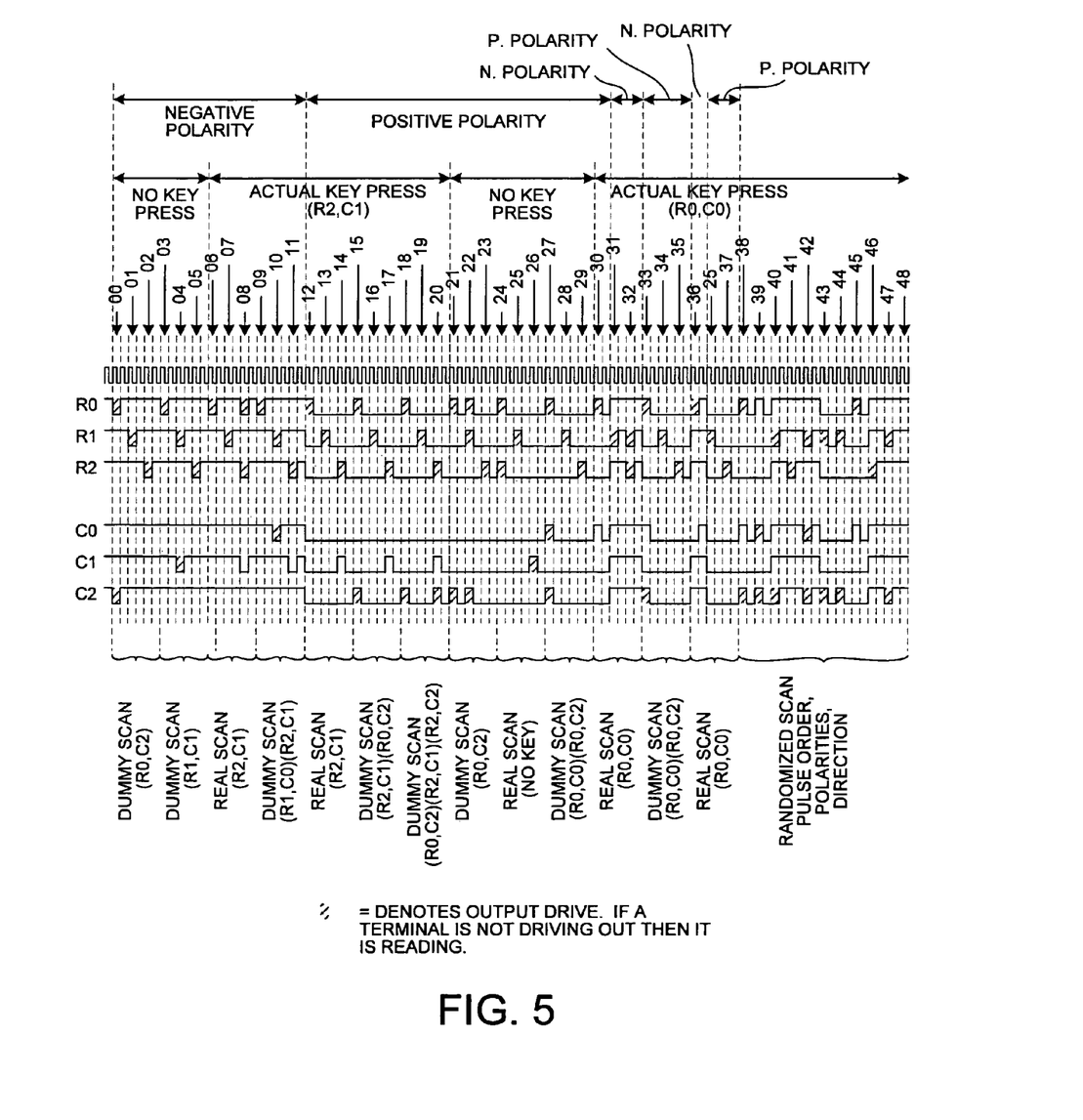
FIG. 5 is a diagram that illustrates several novel aspects.

FIG. 5 is a diagram that illustrates several novel aspects. The numbers 00 through 48 extending from left to right across the diagram indicate the number of a pulse output and pulse detect operation. In the diagram, the cross-hatching indicates that the corresponding pulse on the indicated row line or column line is due to the corresponding input/output cell driving the pulse out onto the indicated row line or column line. In pulse 00 for example, row line R0 is driven with a low pulse by the input/output cell coupled to row line R0. Even though no key is being pressed, a low pulse is exhibited on column line C2. As indicated by the cross-hatching, this pulse on column line C2 is due to the input/output cell coupled to column line C2 driving a low pulse onto column line C2. In pulse 01, row line R1 is driven with a low pulse, but a low pulse is detected on none of the column lines. Similarly, in pulse 02, row line R2 is drive with a low pulse, but a low pulse is detected on none of the column lines. To a hacker, this set of three scan pulses 00, 01 and 02 of the row lines appears to have caused a low pulse on column line C2 due to a switch at the intersection of row line R0 and C2 being pressed. In actuality, however, this key is not being pressed. Rather, integrated circuit 15 has generated this dummy low pulse on column line C2. The row line scan sequence is referred to here as a "dummy scan".

Pulses 03, 04 and 05 illustrate another dummy scan. In this second dummy scan, column line C1 is made to pulse low along with row line R1, thereby indicating that the switch at the intersection of R1 and C1 is pressed. In one novel aspect, such dummy presses are repeated consistently such that the waveform on a row line and a waveform on a column line are identical for a period of time that substantially matches the amount of time a key would be pressed in a real key press condition. In one example, this period of time is at least one quarter of a second. In one novel aspect, it is recognized that if dummy pulses are injected in random fashion at a rapid rate that is at a higher frequency that the frequency of an ordinary actual key press, then a thief can analyze the waveforms and differentiate the higher frequency dummy pulses from the more constant and slower changing actual key press signals. A true key press would cause a row line and a column line to have identical waveforms for a substantial period of time. By injecting dummy pulses such that the dummy waveform is identical to the actual key press waveform for a period of at least one quarter of a second, distinguishing dummy pulse waveforms from actual pulse waveforms is made more difficult. In a still further refinement of the novel technique, the duration of the dummy waveform is made to vary from one dummy waveform to the next. The processor can change the duration by a random amount within a range of plus or minus a percentage. The percentage may, for example, be one hundred percent.

In accordance with another novel aspect, an actual key press is detected by driving more than one row line with pulses. Pulse 08, for example, illustrates driving low pulses onto row lines R0 and R2. In response, a low pulse is detected on column line C1. The key scanning routine has just recently driven row line R0 with a low pulse in pulse 06. In pulse 06, a low pulse was detected on none of the column lines. The key scanning routine is therefore able to determine that the low pulse detected on column line C1 in pulse 08 is due to the pulse output onto row line R2 and not due to the pulse output onto row line R0. Although this example involves driving pulses onto two row lines simultaneously and detecting pulses on the column lines, a key press can be detected by driving pulses onto two column lines and detecting pulses on the row lines. Similarly, pulses can be driven onto more than two lines during this type of detecting of an actual key press.

In accordance with another novel aspect, not only are low pulses used along with pullup resistances in the receiving cells, but also high pulses are used along with pulldown resistances in the receiving cells. Pulses 00 through 11 in FIG. 5 represent "negative polarity". Negative polarity means that the pulses are low pulses as illustrated. Pulses 12 through 30, on the other hand, represent a "positive polarity". Positive polarity means that the pulses are high pulses as illustrated.

In accordance with another novel aspect, a dummy pulse is supplied onto a column line during the detection of an actual key press as indicated in pulse 20. The key being pressed is the key at the intersection of row R2 and column C1 as indicated in FIG. 5. This key press is properly detected in pulse 20, but column line C2 is also driven with a dummy high pulse as illustrated to camouflage the actual key press detect.

As illustrated in FIG. 5, dummy key press waveforms can be supplied onto the row and column lines during the time when no key is actually being pressed. Also, during a time when a key is actually being pressed, dummy key press waveforms can be supplied onto row lines and/or column lines that-otherwise would see no pulses in order to camouflage the actual key press detection.

In another novel aspect, key presses are detected either by driving pulses out on row lines and by detecting the pulses back on column lines, or by driving pulses out on column lines and detecting the pulses back on row lines. The driving out on a row line and detecting on a column line is referred to here as a first direction, whereas the driving out on a column line and detecting on a row line is referred to here as a second direction. In the apparatus of U.S. Pat. No. 4,926,173, the column lines cannot be used to detect incoming signals.

Figure 6:
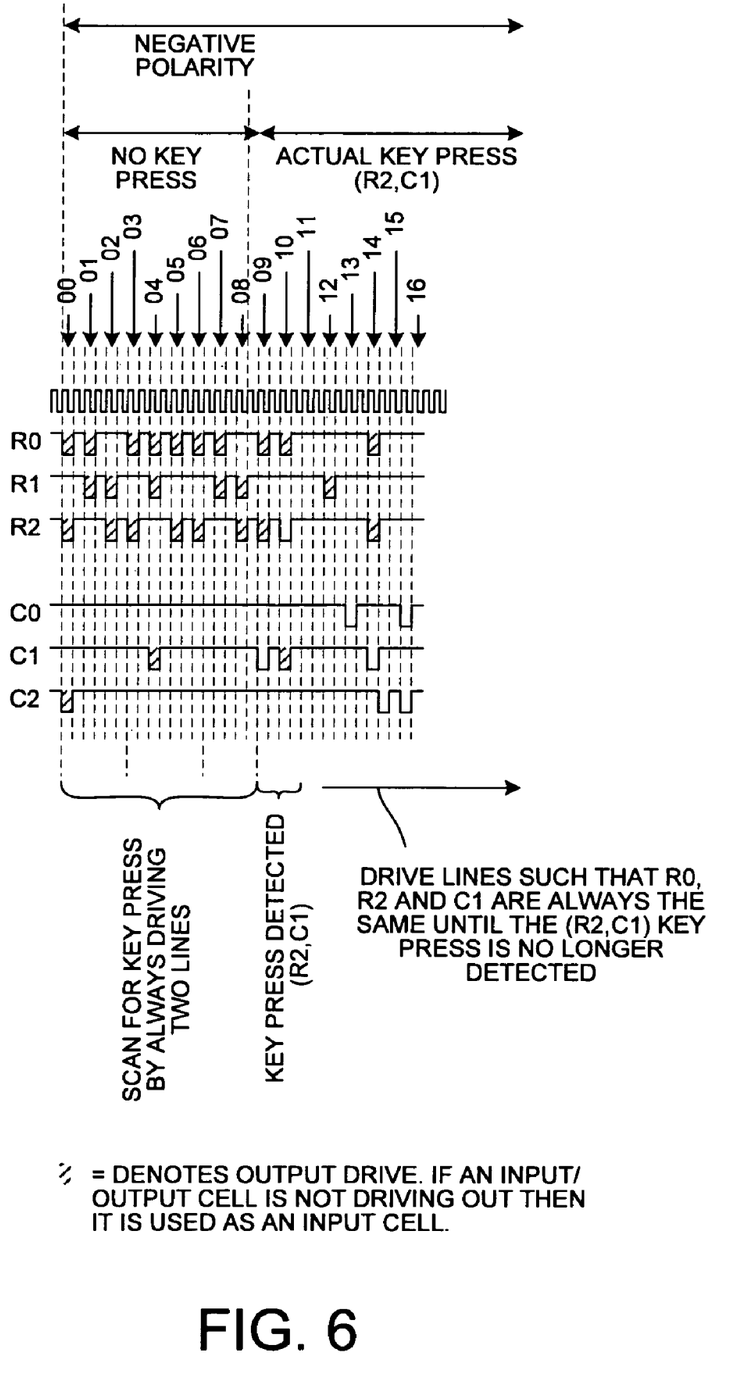
FIG. 6 is a diagram that illustrates a novel method whereby a key press is detected and the key that was pressed is identified while three lines are driven with identical waveforms. The three lines include two intersecting lines that are shorted together due to the actual key press.

FIG. 6 illustrates a novel use of the directional capability of the novel circuit of FIG. 4. In pulses 00 through 08, no key is being pressed. This condition is detected by the key scanning routine, and the key scanning routine periodically injects dummy pulses as described previously. Although not illustrated this way in FIG. 6, these dummy pulses are made to recur consistently and in a sustained manner such that the dummy waveform is identical to an actual key press waveform (on a row and column line pair) for a period of at least one quarter of a second.

Then, in pulse 09, when key scanning routine is causing two row lines R0 and R2 to be driven with low pulses, a low pulse of an actual key press is detected on column line C1. In accordance with one novel aspect, the key scanning routine identifies and responds to this condition by driving the line on which the pulse was detected, and by using the input/output cell associated with one of the lines that were driven as an input cell. In the present example, the key scanning routine causes a low pulse to be driven onto column line C1 and causes the input/output cell associated with row line R2 to be used as an input cell. The other line that was driven with a low pulse (row line R0) is again used as an output cell to output a pulse. Accordingly, during the next pulse 10 a low pulse is detected on row line R2. The key scanning routine therefore determines that the reason that a low pulse was detected on column line C1 in pulse 09 must have been due to the key at the intersection of row line R2 and column line C1 being pressed, and was not due to the key at the intersection of row line R0 and column line C1 being pressed. Importantly, the waveforms on row line R0, row line R2 and column line C1 are all identical. A thief cannot use the knowledge that the row and column lines of the actual key press will be identical but the dummy pulses on the other lines will make the other lines have different waveforms. The thief cannot use this knowledge to identify which one of the row lines R0 and R2 is the correct row line for the actual key press.

Then, after this initial actual key press detection of pulses 09 and 10, the key scanning routine continues to drive the row and column lines such that the waveforms on row line R0, row line R2 and column line C1 remain identical for at least one quarter of a second. Alternatively, the key scanning routine continues to drive the row and column lines such that the waveforms on row line R0, row line R2 and column line C1 remain identical until the actual key press is no longer detected.

Figure 7A:
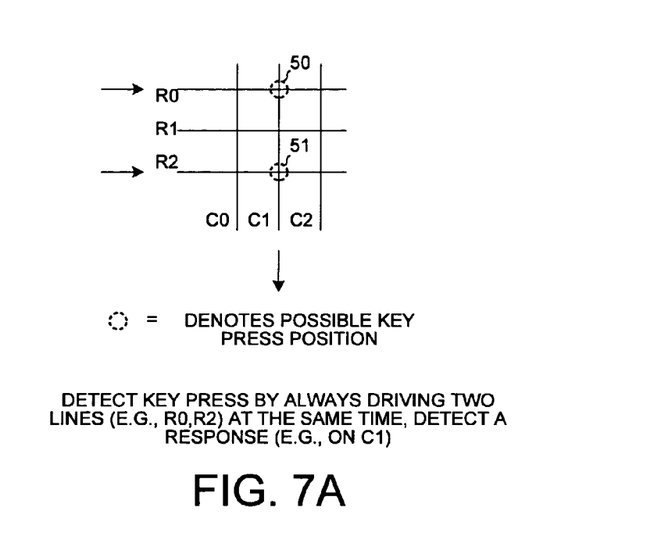
FIGS. 7A, 7B and 7C illustrate steps in the method set forth in FIG. 6.
Figure 7B:
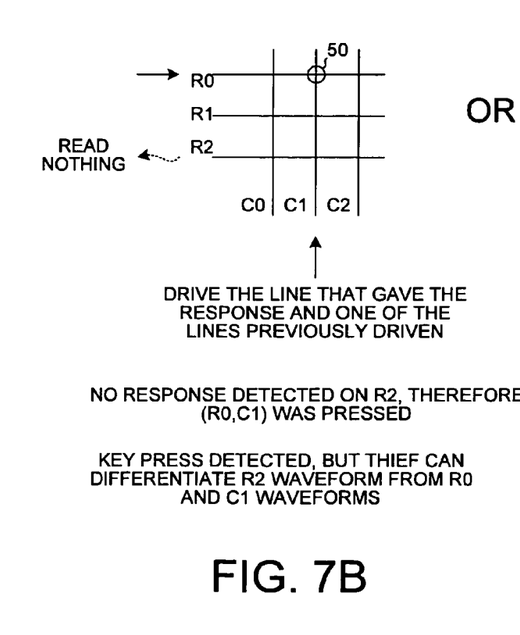
Figure 7C:
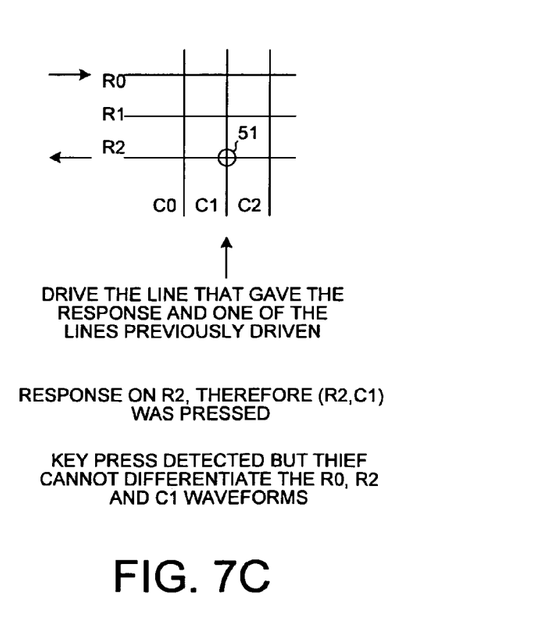

FIGS. 7A, 7B and 7C are diagrams that illustrate the novel method set forth in FIG. 6. FIG. 7A illustrates how at least two row lines are driven during a time of no key press until a key press is detected. In the example of FIG. 7A, both row lines R0 and R2 are driven with pulses, and a pulse is detected on column line C1. At this point in the method, the key scanning routine has not identified which of switches 50 and 51 is pressed.

FIG. 7B illustrates a first possibility of a next pulse, and FIG. 7C illustrates a second possibility of the next pulse. The direction of pulses is changed, and a pulse is driven onto column line C1. Row line R2 is then used as an input to determine whether the pulse will be received on line R2 or not. In the case of FIG. 7B, the actual key that was pressed is key 50. No pulse is therefore detected on row line R2. The key scanning routine has detected that the key press must have been due to the key 50 at the intersection of row line R0 and column line C1, but the waveforms on the three lines R0, R2 and C1 are not identical.

FIG. 7C illustrates a more fortunate scenario in which the key that was pressed is key 51. The key scanning routine performs the same as in the case of the example of FIG. 7B by driving a pulse out onto column line C1 and using row line R2 to determine whether the pulse will be communicated through key 51. In the example of FIG. 7C, however, the key scanning routine detects the pulse on row line R2 and determines that the key that was pressed is key 51. Advantageously, however, the waveforms on all three lines R0, R2 and C1 are identical. Once the actual key press has been determined in this manner, dummy pulses are driven during the following key scanning routine such that for a period of at least one quarter of a second the R0, R2 and C1 waveforms are identical.

Although certain specific embodiments are described above for instructional purposes, the teachings of this patent document have general applicability and are not limited to the specific embodiments described above. In one example, the input/output cell includes a current drive sensor that determines whether the output driver of the cell is outputting a current that exceeds a predetermined value. An additional current sense register G is provided that stores the current sense value for each of the input/output cells. Such current sense values can be used to determine whether an input/output cell that is configured as an output cell is driving a signal through a pressed key, or whether the output cell is simply driving an isolated row or column line. The term "row" as it is used in this document does not require any particular direction relative to a person or a viewer considering the RLCLM. Similarly, the term "column" does not define any required direction. Rather, the terms "row" and "column" are relative terms that define directions relative to one another. Accordingly, various modifications, adaptations, and combinations of various features of the described embodiments can be practiced without departing from the scope of the invention as set forth in the claims.

What is claimed is:

1. A method comprising:
    (a) driving a first signal out onto a first row line, wherein the first row line is one of a plurality of row lines of a row line/column line matrix (RLCLM) of a key switch array;
    (b) detecting the first signal on a first of a plurality of column lines of the RLCLM;
    (c) driving a second signal out onto said first column line; and
    (d) detecting the second signal on first row line.

2. The method of claim 1, further comprising:
    driving a third signal out onto a second row line during the driving in (a) of the first signal onto the first row line.

3. The method of claim 2, wherein steps (a) through (d) are parts of a key scanning operation that determines which one of the keys of the key switch array is pressed.

4. The method of claim 1, further comprising:
    driving a third signal onto a second column line during the driving in (a) of the first signal.

5. The method of claim 1, wherein the first signal is a pulse of a low voltage, and wherein the second signal is a pulse of the low voltage.

6. The method of claim 5, further comprising repeating steps (a) through (d) with the first signal being a pulse of a high voltage and with the second signal being a pulse of the high voltage.

7. The method of claim 2, wherein steps (a) through (d) are parts of a key scanning operation that determines which one of the keys of the key switch array is pressed, and wherein during the key scanning operation a first waveform is present on the first row line that is substantially identical to a second waveform that is present on the second row line, wherein the first and second waveforms are substantially identical for a period of time that is at least one quarter of a second in duration.

8. A method comprising:
   (a) performing a key scanning operation by driving pulse signals into a row line/column line matrix (RLCLM) of a key switch array and monitoring a plurality of lines of the RLCLM;
   (b) detecting a first pulse signal on one of the plurality of lines during the monitoring of (a); and
   (c) in response to the detecting in (b) changing the key scanning operation by driving a second pulse signal onto said one of the plurality of lines.

9. The method of claim 8, wherein at least two lines of the RLCLM are being simultaneously driven with pulse signals during the detecting of (b), and wherein said one of the plurality of lines in (c) is one of said at least two lines.

10. The method of claim 9, wherein the key scanning operation is changed in (c) such that at least three lines of the RLCLM have substantially identical waveforms for a period of at least one quarter of a second.

11. An integrated circuit comprising:
   a plurality of input/output cells;
   a plurality of terminals, wherein each terminal is coupled to a corresponding respective one of the plurality of input/output cells;
   a memory that stores a set of processor-readable instructions, wherein the set of processor-readable instructions is a key scanning routine; and
   a processor that executes the set of processor-readable instructions such that: 1) a first pulse signal is driven out of a first of the input/output cells and a first of the terminals, and during the driving of the first pulse signal a second of the input/output cells is monitoring a second of the terminals to determine whether the first pulse signal is received on the second terminal, and 2) a second pulse signal is driven out of the second input/output cell and the second terminal, and during the driving of the second pulse signal the first input/output cell is monitoring the first terminal to determine whether the second pulse signal is received on the first terminal.

12. The integrated circuit of claim 11, wherein the processor executes the set of processor-readable instructions such that: 3) during the driving of the first pulse signal a third signal is driven out of a third of the input/output cells and a third of the terminals.

13. The integrated circuit of claim 12, wherein the processor executes the set of processor-readable instructions such that pulse signals are driven out of selected input/output cells and their associated terminals and such that others of the input/output cells and their associated terminals are monitored to determine whether the pulse signals are received on the others of the input/output cells, wherein some of the pulse signals are of a first pulse polarity and other of the pulse signals are of a second pulse polarity.

14. The integrated circuit of claim 12, wherein the processor executes the set of processor-readable instructions such that if a pulse signal is detected on an input/output cell A that is not driving a pulse signal out of the integrated circuit then operation of the key scanning routine changes such that the input/output cell A and at least two other input/output cells B and C are controlled such that substantially identical waveforms appear on their corresponding terminals for a period of at least one quarter of a second during a key press condition.

15. An integrated circuit comprising:
   a memory that stores a set of processor-readable instructions, wherein the set of processor-readable instructions is a key scanning routine; and
   a processor that executes the set of processor-readable instructions;
   a polarity bit;
   an input/output bit;
   an input read bit;
   a terminal; and
   an input/output cell that is coupled to the terminal and that includes a logic circuit, wherein if the input/output bit has a first value then the logic circuit supplies either the value of the polarity bit or the inverse of the value of the polarity bit to the input read bit, whereas if the input/output bit has a second value then the logic circuit is usable to supply a value on the terminal to the input read bit.

16. The integrated circuit of claim 15, wherein execution of the key scanning routine causes a positive pulse to be output from the terminal, wherein the polarity bit is a digital high value indicating that the pulse is a positive pulse, wherein the logic circuit supplies the inverse of the polarity bit value to the input read bit, the inverse of the polarity bit value being a digital low value.

17. The integrated circuit of claim 16, wherein execution of the key scanning routine at a later time causes the input/output cell to be used as an input cell and causes the input/output bit to have the second value, wherein during this later time the logic circuit supplies a value on the terminal to the input read bit.

18. The integrated circuit of claim 15, further comprising:
   a pullup/pulldown bit, wherein if the input/output bit has the second value and the pullup/pulldown bit has a first value then a pullup resistance within the input/output cell is coupled to the terminal, whereas if the input/output bit has the second value and the pullup/pulldown bit has a second value then a pulldown resistance within the input/output cell is coupled to the terminal, whereas if the input/output bit has the first value then neither the pullup resistance nor the pulldown resistance is coupled to the terminal.

19. A method for Key Switch array detection comprising:
   providing a logic circuit within input/output cell of an integrated circuit, wherein if the input/output cell is configured as an input cell then the logic circuit supplies a value on a terminal to an input read bit, whereas if the input/output cell is configured as an output cell then the logic circuit is usable to supply a selectable one of either a value of a polarity bit or the inverse of the value of the polarity bit to the terminal.

20. A method for Key Switch array detection comprising:
   providing a logic circuit within an input/output cell of an integrated circuit, wherein if the input/output cell is configured as an input cell and a mask bit has a first value then the logic circuit supplies a value on a terminal to an input read bit, whereas if the input/output cell is configured as an input cell and the mask bit has a second value then the logic circuit supplies a mask value to the input read bit, whereas if the input/output cell is configured as an output cell then the logic circuit supplies either a value of a polarity bit or the inverse of the value of the polarity bit to the terminal.

21. An integrated circuit comprising:

a plurality terminals; and means for using the plurality of terminals in a key scanning operation, wherein in response to a keypress condition the key scanning operation causes signal waveforms on at least three of the terminals to be substantially identical for a period of at least one quarter of a second.

22. The integrated circuit of claim 21, wherein the means causes the signal waveforms on said at least three terminals to be substantially identical for the period by causing at least two of the three terminals to be simultaneously used as outputs if any of the three terminals is being as an output.

23. The integrated circuit of claim 21, wherein the means causes a first current to flow out of a first of the three terminals and into a second of the three terminals in a first time period, and then causes a second current to flow out of second terminal and into the first terminal in a second time period, wherein the first and second time periods are parts of said period of at least one quarter of a second.

24. The integrated circuit of claim 21, wherein a first set of the plurality of terminals is coupled to row lines of a row line/column line matrix (RLCLM) of a key switch array, wherein a second set of the plurality of terminals is coupled to column lines of the RLCLM, wherein during some time of the key scanning operation each terminal of the first set and each terminal of the second set is used as an input terminal to read a signal from the RLCLM, and wherein during some time of the key scanning operation each terminal of the first set and each terminal of the second set is used as an output terminal to drive a signal onto the RLCLM.

* * * * *